(12) United States Patent
Chaix

(10) Patent No.: US 7,122,273 B2
(45) Date of Patent: Oct. 17, 2006

(54) LIGHT BIPOLAR PLATE FOR FUEL CELL AND METHOD FOR MAKING SAME

(75) Inventor: Jean-Edmond Chaix, Pierrevert (FR)

(73) Assignee: Helion, Aix En Provence Cedex (FR)

( * ) Notice: Subject to any disclaimer, the term of this patent is extended or adjusted under 35 U.S.C. 154(b) by 631 days.

(21) Appl. No.: 10/466,977

(22) PCT Filed: Jan. 24, 2002

(86) PCT No.: PCT/FR02/00290

§ 371 (c)(1),
(2), (4) Date: Jul. 23, 2003

(87) PCT Pub. No.: WO02/059995

PCT Pub. Date: Aug. 1, 2002

(65) Prior Publication Data

US 2004/0058221 A1    Mar. 25, 2004

(30) Foreign Application Priority Data

Jan. 26, 2001    (FR) .................................. 01 01081

(51) Int. Cl.
*H01M 2/00* (2006.01)
*H01M 2/36* (2006.01)
*H01M 6/00* (2006.01)

(52) U.S. Cl. ........................... 429/122; 429/34; 429/72

(58) Field of Classification Search .................. 429/34, 429/72, 122
See application file for complete search history.

(56) References Cited

U.S. PATENT DOCUMENTS

| 4,169,917 | A | * | 10/1979 | Baker et al. ................... 429/26 |
| 4,732,637 | A | * | 3/1988 | Dettling et al. .............. 156/295 |
| 5,514,487 | A | | 5/1996 | Washington et al. |
| 5,770,033 | A | * | 6/1998 | Murphy et al. .............. 205/464 |
| 6,372,376 | B1 | * | 4/2002 | Fronk et al. ................... 429/41 |
| 6,596,427 | B1 | * | 7/2003 | Wozniczka et al. ........... 429/32 |

FOREIGN PATENT DOCUMENTS

| DE | 33 21 984 A1 | 12/1983 |
| EP | 0 975 039 A2 | 2/2000 |
| EP | 1 020 941 A2 | 7/2000 |
| FR | 2 810 795 | 6/2000 |
| JP | 10-241709 | 9/1998 |
| JP | 10-284094 | 10/1998 |
| JP | 11-297337 | 10/1999 |
| JP | 2000-231927 | 8/2000 |
| WO | WO 97/50139 | 12/1997 |
| WO | WO 99/56333 | 11/1999 |
| WO | WO 00/44059 | 7/2000 |

* cited by examiner

*Primary Examiner*—Dah-Wei Yuan
(74) *Attorney, Agent, or Firm*—Pearne & Gordon LLP

(57) ABSTRACT

The two-pole plate is relatively lightweight and can be manufactured quickly and easily.

Figure 1:
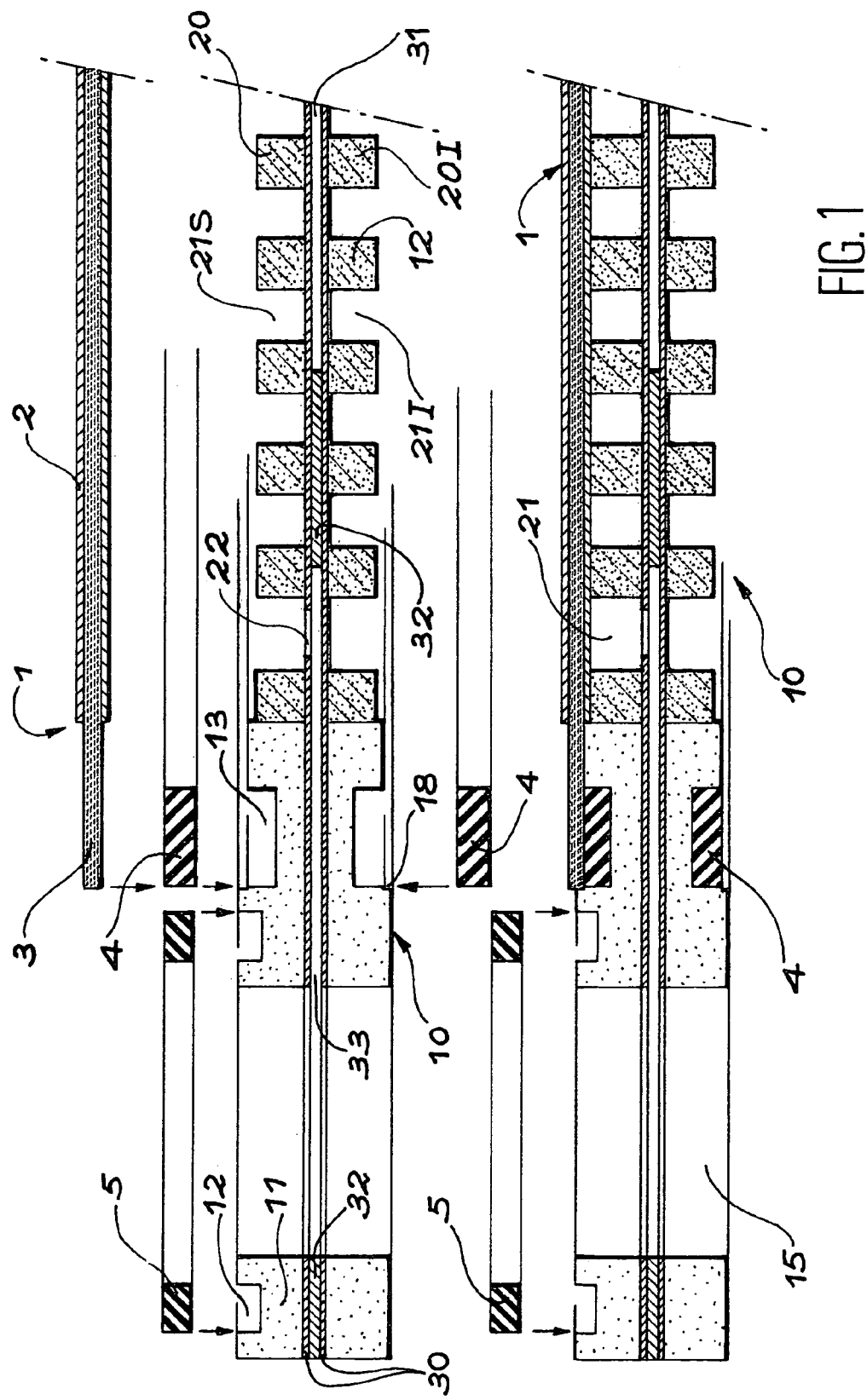

It consists of a skeleton made with two thin plates (30) spaced by blocks (34, 45) between which a cooling fluid circulates. The fuel and oxidant manifolds supply the circulation channels (21I) machined by water jet in supply plates (20I, 20S) made of conducting composite, through the supply channels (33). These plates are bonded with a conducting glue onto the thin plates (30).

Application to fuel cells.

7 Claims, 4 Drawing Sheets

LIGHT BIPOLAR PLATE FOR FUEL CELL AND METHOD FOR MAKING SAME

DOMAIN OF THE INVENTION

The invention relates to the domain of fuel cells consisting of a stack of a large number of basic elements, each comprising two pole plates through which the oxidant and the fuel are transferred to a separating membrane placed between the two pole plates.

This type of fuel cell is used in applications for electrical vehicles for which many development studies are now being carried out, particularly surface public transport vehicles such as buses, tramways and other trolleybuses. Many other applications are possible, particularly on fixed installations such as stationary electricity generation systems, like those used in hospitals or other service buildings in which an electricity power supply failure cannot be tolerated.

PRIOR ART AND PROBLEM THAT ARISES

Many fuel cells are composed of a sequence of basic elements each comprising two electrodes including one anode and one cathode that are supplied continuously with and oxidant and a fuel, that remain separated by an ion exchanging membrane that acts like an electrolyte. The ion exchanging membrane may be formed from a solid polymer electrolyte and separates the anode compartment in which the fuel such as hydrogen is oxidized, from the cathode department in which the oxidant such as oxygen in the air is reduced. Therefore two simultaneous reactions occur at this level, firstly oxidation of the fuel at the anode and secondly reduction of the oxidant at the cathode. These two reactions are accompanied by a potential difference being set up between the two electrodes.

When the oxidant is oxygen, for example in the form of air, and the fuel is pure gaseous hydrogen, the $H^+$ and $O^-$ ions combine and generate electricity in the form of this potential difference. The reaction at the anode can be represented as follows:

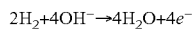
$$2H_2 + 4OH^- \rightarrow 4H_2O + 4e^-$$

The reaction at the cathode can be represented by the following formula:

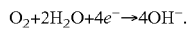
$$O_2 + 2H_2O + 4e^- \rightarrow 4OH^-.$$

Each basic element in a stack of a fuel cell is composed of a central assembly that therefore includes the membrane sandwiched between the two electrodes, this assembly itself being placed between two plates called the "pole plates". These pole plates perform several functions.

The first of these functions is to bring firstly the fuel, for example hydrogen, and secondly the oxidant, for example air containing oxygen, into contact with the assembly consisting of the membrane and the electrodes. This is done by providing a channel over the entire face of the pole plates in contact with the membrane. Each channel has an entry through which the oxidant or the fuel enters, for example in dry or wet gaseous form, and an exit through which neutral gases are evacuated, together with water generated by the oxygen reduction reaction on the air side and residual moisture from hydrogen on the hydrogen side. Obviously, the two circuits must be perfectly sealed from each other and from the outside.

The second function of the pole plates is to collect electrons produced by the oxygen reduction reaction.

The third function of these pole plates is to evacuate heat produced jointly with the electrons during this hydrogen reduction reaction.

Consequently, these pole plates are necessarily firstly capable of conducting electricity, and secondly insensitive to corrosion caused by the oxidant and the fuel, in other words oxygen in the air and hydrogen. Therefore they can be made of carbon, or a plastic material containing an additive stainless steel alloy such as stainless steel, austeno-ferritic, austenitic steel, or a chrome-nickel alloy, chrome-plated aluminum, etc.

Furthermore, in the context of fuel cells composed of a stack of basic elements, the pole plates also perform a collective function for the entire stack, so as to form fuel and oxidant supply manifolds, and the heat exchange function, thus cooling the cell from which the stack is made. Therefore, the shape of the pole plates is complex and there are frequently two different types, one for each side of the basic element.

In the context of manufacturing fuel cells, there is a need to limit the number of steps involved in manufacturing pole plates in order to reduce the production cost, particularly for long and expensive machining operations.

The purpose of the invention is to propose a design for unique basic elements and pole plates that can be manufactured easily and inexpensively.

SUMMARY OF THE INVENTION

The first main purpose of this invention to achieve this purpose is a two-pole plate forming the first pole plate of a first basic element of a fuel cell and the second pole plate of a second basic element adjacent to the first basic element in the same fuel cell, comprising:

a flat central skeleton composed of two thin plates, fixed parallel to each other at a spacing by gluing and using blocks, and thus delimiting a first space to enable circulation of coolant;

two supply plates made of composite conducting material placed on each side of the flat central skeleton except on the edge, and on each of which at least one fuel or oxidant circulation channel is formed; and a frame made of a dielectric material placed on each side of the flat central skeleton and around the supply plates;

manifold holes being provided around the periphery of the thin plates and the frame to form manifolds for fuel, oxidant, and supply channels being provided between these thin plates to connect these manifold holes to the circulation channels.

Preferably, the thin plates and the supply plates are made of phenolic graphite.

The flat central skeleton is advantageously finished by the use of drilled blocks placed around the manifolds formed by manifold holes and placed between the two thin plates to contribute to continuity of the manifolds.

It is very advantageous to use silicone seals placed on the surfaces of the frame around the holes forming the fuel and oxidant manifolds, and at the periphery of the membrane of a membrane/electrodes assembly to make a leak tight joint between the two two-pole plates.

When the shape of each two-pole plate is square, the at least one oxidant or fuel circulation channel on each surface of the supply plate is in the shape of a square spiral.

The second main purpose of the invention is a process for manufacturing a two-pole plate as defined in the previous sections.

The main steps are as follows, in sequence:

fixing the two thin plates to each other, by means of blocks, by gluing with a conducting glue;

machining by water jet of the circulation channels in the two supply plates;

gluing of the supply plates made of a conducting composite around the flat central skeleton, using a conducting glue; and injection of a dielectric thermoplastic material into the frame.

Silicone seals may be injected on the frame surfaces at the same time at this fourth step.

LIST OF FIGURES

Figure 2:
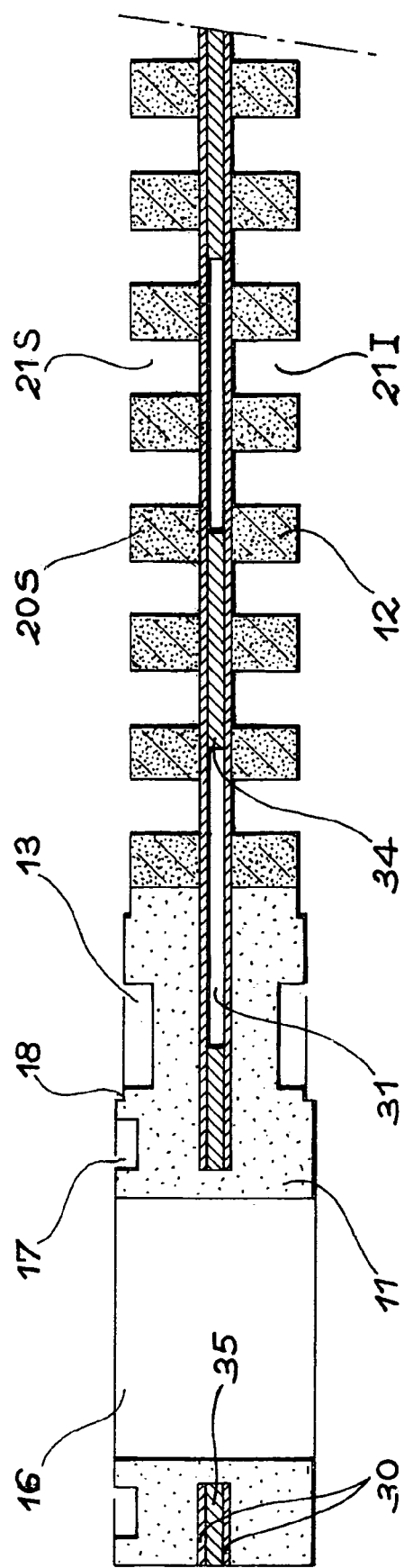
Figure 3:
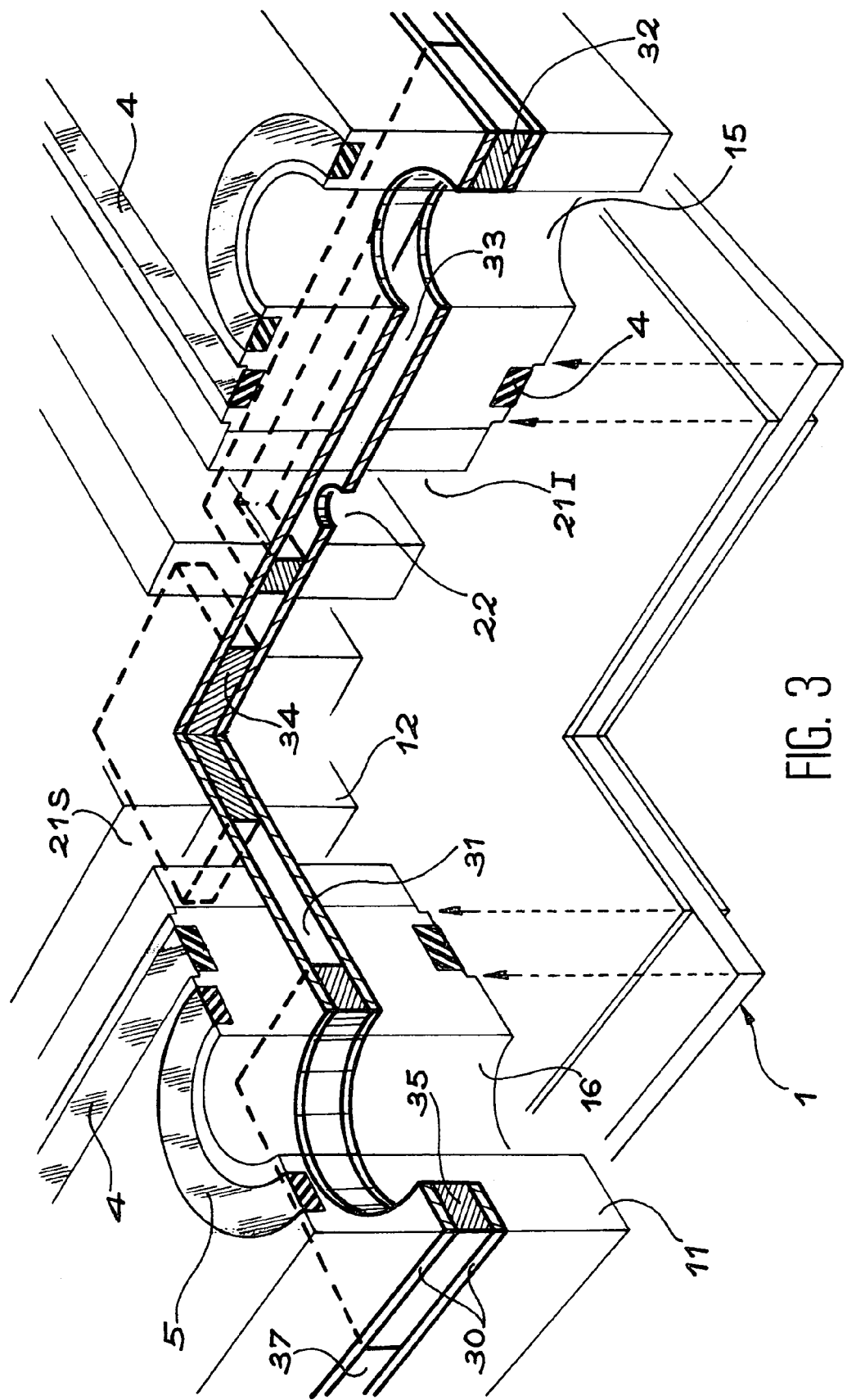
Figure 4:
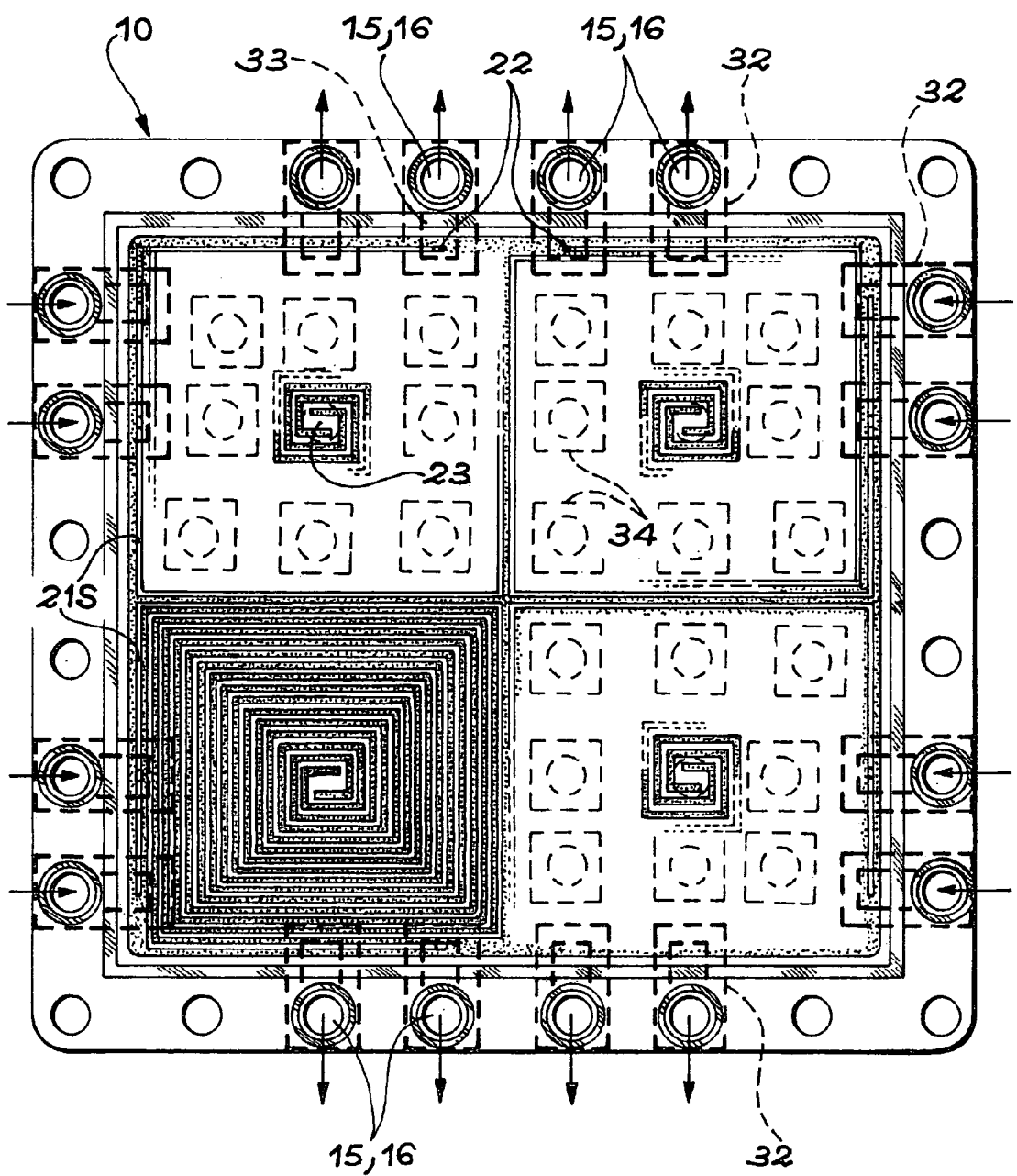

The invention and its various characteristics and advantages will be better understood after reading the following description of an embodiment of the invention. It is accompanied by four figures that represent:

FIG. 1, a sectional view of two two-pole plates according to the invention;

FIG. 2, another sectional view of the same two-pole plate according to the invention;

FIG. 3, an exploded isometric sectional view of the corner of the two-pole plate according to the invention; and FIG. 4, a top view of a two-pole plate according to the invention.

DETAILED DESCRIPTION OF AN EMBODIMENT OF THE INVENTION

FIG. 1 shows two membrane/electrodes assemblies 1 and two two-pole plates 10. Therefore, each membrane/electrodes assembly 1 is composed of a membrane 3 surrounded by two electrodes 2 over its entire surface except at the periphery. Each of these membrane/electrodes assemblies 1 must be placed between two two-pole plates 10.

Each two-pole plate 10 comprises mainly a flat central skeleton, on each side of which a supply plate 20S is fixed on one side and a supply plate 20I is fixed on the other side, each made of a composite material, and a frame 11 made of a dielectric material in the peripheral part.

The flat central skeleton is composed essentially of two thin plates 30 at a spacing of 1 to 2 mm from each other. Advantageously, they are composed of graphite with a phenolic resin filler to make them chemically inert and insensitive to different types of corrosion, but particularly to make them lightweight. They are fixed at their central part in this position, using blocks not shown in FIG. 1. A space 31 is thus delimited at the center of this assembly and is designed to hold and to contain circulation of the cooling fluid, for example water, to cool each stage of the stack of the fuel cell.

The thin plates 30 are drilled with several holes around their periphery to contribute to forming continuous oxidant and fuel manifolds 15, and also to form a space for tie-rods, not shown, that fix the various stages of the fuel cell together. It will be noted that the two thin plates 30 at these manifolds 15 define a second space forming a supply channel 33 isolated from the first space 31 by means of a hollow supply spacer block 32. This hollow supply spacer block also surrounds the manifold 15 and a fuel or oxidant supply orifice 22 opening up into a supply plate 20S, at a circulation channel 21S that itself opens up on the outside surface of the assembly. A supply plate 20S or 20I is bonded onto each side of the flat central skeleton and will be used to distribute oxidant or fuel over the entire surface of one of the two electrodes in the membrane/electrodes assembly 1.

One of the main characteristics of the invention is due to the fact that the circulation channels 21S and 21I pass through the entire thickness of the corresponding plates 20S and 21I. Thus, these channels can be machined in series. If several supply plates are stacked one on the other before forming the supply channels 21S and 21I, it will be possible to machine several plates at the same time in a single operation. The material from which these supply plates 20S and 20I are made is a composite material such as graphite, and particularly graphite with a phenolic resin filler. This material may be machined with a water jet. It is thus easy to understand that a single machining phase using a water jet can machine the channels in several plates by penetration. Furthermore, by using the numerical control, it is possible to draw many different patterns of the supply channels 21S, 21I on these supply plates 20I and 20S. Furthermore, the machining time is extremely short.

It is easy to understand that each electrode in the membrane/electrodes assemblies 1 may be in contact with the fuel or the oxidant, when the membrane/electrodes assembly 1 is placed between two two-pole plates 10, as shown in the lower part of the figure. A membrane seal 4 is placed in a peripheral recess 13 surrounding the supply plates 20S and 20I.

It can be seen that one supply channel 33 only supplies the upper circulation channel 21S. The manifold formed in part by the hole in manifold 15 shown in this FIG. 1 contains only oxidant or fuel. Similarly, other manifolds contain the fuel complementary to the fuel circulating in the circulation channel 21S to supply the lower channels 21I. Thus, fuel is circulated on a first face in a first of these circulation channels 21S, and oxidant is circulated on the other face in a second circulation channel 21I.

With reference to FIG. 2, there is no need for all manifold holes to communicate with one of the two circulation channels 21S and 21I through a supply channel 33. Consequently, FIG. 2 shows a second type of manifold hole 16 that is not in fluidic communication with the circulation channels 21S and 21I. In this case, the entire internal wall of each manifold hole 16 is formed from the frame 11. This is achieved by providing each thin plate 30 with a hole with a diameter greater than the inside diameter of the manifold so that the material, for example a dielectric thermoplastic, from which the frame 11 is made can occupy the entire height of the pole plate at this level.

Therefore, FIG. 2 shows that the space 31 remains between the two thin plates 30 for the circulation of water contributing to cooling of the fuel cell.

FIGS. 1 and 2 both show that spot facing 18 is applied on each of the two surfaces of the frame 11, inside the frame, for positioning each membrane 3 and for holding it in place.

FIG. 3 is a stripped view that helps to give a better understanding of the difference between the two types of manifold holes. A manifold hole 15 like that shown in FIG. 1 can be seen on the right part of FIG. 3. Therefore, it forms a passage for the fuel or oxidant circulating in the manifold formed by it and the other manifold holes located above and below it, to the circulation channel 21, through the supply channel 33 and the supply holes 22. This figure clearly shows the hollow supply spacer block 32 that surrounds the manifold hole 15 and the supply hole 22 to form the supply channel 33.

There is a spacer block 34 in the middle of this FIG. 3, between the two thin plates 30. Therefore, the function of this spacer block is to maintain a distance between the two metallic plates, so as to define the various spaces mentioned above, namely the first space 31 that will be used for cooling the fuel cell by water, and the supply channels 33. Note that the first spaces 31 lead to the outside through outlets 37. In this way, the entire fuel cell composed of the stack of different stages, each comprising a membrane/electrodes assembly and two pole plates, can be immersed in a water bath to facilitate cooling by free circulation of the cooling fluid, for example water.

The right part of this FIG. 3 shows that another type of spacer block 35 is provided to surround the second type of manifold holes 16 and to keep the two thin plates 30 at the appropriate distance.

It is easy to see the rectangular peripheral shape of the peripheral seal 4 and the circular shape of the manifold seals 5 in FIG. 3.

FIG. 4 shows a complete two-pole plate, and particularly the manner in which the circulation channels 21S are arranged on a surface of such a two-pole plate. In the example shown, four circulation channels 21S are implanted on the same surface of a two-pole plate 10. Each of these circulation channels 21S is in the shape of a square spiral, for which the center 23 can be seen. Each is supplied by one of the manifolds, in this case shown with their manifold holes 15 and 16, and the return flow takes place through another of these same manifolds. Since the number of circulation channels is the same on each side of the two-pole plate, the number of manifolds is doubled. In other words, eight supply manifolds and eight return manifolds are necessary if there are four circulation channels on each side of the two-pole plate. Therefore, the arrows shown in this FIG. 4 represent these supplies and returns for each of the eight circulation channels in a particular two-pole plate.

Dashed lines are also shown to represent the hollow supply blocks 32 that surround a manifold 15 or 16, and a supply orifice 22 and a supply channel 33. Similarly, dashed lines are used to represent all blocks 34 keeping the metal plates separate from each other and parallel to each other.

Therefore, the process for manufacturing this type of two-pole plate consists of a first phase in which a flat central skeleton is built up composed of the two thin plates 30, preferably made of phenolic graphite, and blocks 32, 34 and 35 made of the same material by hot gluing under a press.

Thus, several tens of flat central skeletons can be assembled simultaneously.

The supply plates 20I and 20S, previously machined with a water jet, are glued to the flat central skeleton thus formed.

The glue used must be conducting.

The last step in the fabrication of these elements is polymerization.

The frame is made by injecting dielectric thermoplastic material. The silicone manifold seal 5, peripheral seal 4 and supply seal 32 are also injected at the same time as this injection.

ADVANTAGES OF THE INVENTION

This two-pole plate structure is particularly lightweight, since it uses a phenolic graphite and plastic.

Manufacturing is particularly easy and may be used for a large number of two-pole plates.

The use of graphite plates delivered as plates can give very precise parallelism between the faces of the two-pole plates. This is frequently achieved by grinding with a grinding tool.

The invention claimed is:

1. Two-pole plate forming the first pole plate of a basic element of a fuel cell and the second pole plate of a second basic element adjacent to the first basic element in the same fuel cell, comprising:

a flat central skeleton composed of two thin plates (30), fixed parallel to each other at a spacing by gluing and using blocks (32, 34, 35), and thus delimiting a first space to enable circulation of coolant;

two supply plates (20I, 20S) made of composite conducting material placed on each side of the flat central skeleton except on the edge, and on each of which at least one fuel or oxidant circulation channel (21S, 21I) is formed; and a frame (11) made of a dielectric material placed on each side of the flat central skeleton and around the supply plates (20I, 20S);

manifold holes (15, 16) being provided around the periphery of the flat central skeleton and the frame (11) to form manifolds for fuel and oxidant, and supply channels (33), being provided between these thin plates (30) to connect these manifold holes (15, 16) to the circulation channels (21S, 21I).

2. Two-pole plate according to claim 1, characterized in that the thin plates (30) and the supply plates (20I, 20S) are made of phenolic graphite.

3. Two-pole plate according to claim 1, characterized in that the skeleton comprises drilled blocks (35) placed around the manifolds consisting of manifold holes (16) placed between the two thin plates (30) to contribute to continuity of the fuel and oxidant manifolds.

4. Two-pole plate according to claim 1, characterized in that it comprises silicone seals (4, 5) placed on the surfaces of the frame (11) around the fuel and oxidant manifolds, and at the periphery of the membrane (3) of a membrane/electrodes assembly (1) to make the joint between the two two-pole plates leak tight.

5. Two-pole plate according to claim 1, the two-pole plate having a square shape, characterized in that the at least one circulation channel (21S, 21I) on each surface of the supply plates (20) is in the shape of a square spiral.

6. Process for manufacturing a two-pole plate according to claim 1, characterized in that it comprises the following steps in sequence:

fixing the two thin plates (30) to each other, by means of blocks (32, 34, 35), by gluing with a conducting glue;

machining by water jet of the circulation channels (21S, 21I) in the two supply plates (20I, 20S);

gluing of the supply plates (20I, 20S) made of a conducting composite around the flat central skeleton, using a conducting glue; and injection of a dielectric thermoplastic material into the frame (11).

7. Manufacturing process according to claim 6, to make a two-pole plate according to claim 6, characterized in that it consists of injecting the silicone seals (4, 5) on the surface of the frame (11) during the third frame (11) injection step.

* * * * *